(12) United States Patent
Masaki et al.

(10) Patent No.: US 9,809,710 B2
(45) Date of Patent: Nov. 7, 2017

(54) AZO DYE COMPOSITION AND METHOD FOR PRODUCING SAME

(71) Applicant: FUJIFILM CORPORATION, Minato-ku, Tokyo (JP)

(72) Inventors: Tomohito Masaki, Kanagawa (JP); Junichi Miyadai, Kanagawa (JP)

(73) Assignee: FUJILM CORPORATION, Tokyo (JP)

( * ) Notice: Subject to any disclaimer, the term of this patent is extended or adjusted under 35 U.S.C. 154(b) by 0 days.

(21) Appl. No.: 15/424,893

(22) Filed: Feb. 6, 2017

(65) Prior Publication Data
US 2017/0145215 A1   May 25, 2017

Related U.S. Application Data

(63) Continuation of application No. PCT/JP2015/066397, filed on Jun. 5, 2015.

(30) Foreign Application Priority Data

Sep. 2, 2014 (JP) .................................. 2014-178029

(51) Int. Cl.
*C09B 62/006* (2006.01)
*C09B 29/36* (2006.01)
(Continued)

(52) U.S. Cl.
CPC ...... *C09B 29/3691* (2013.01); *C09B 29/0092* (2013.01); *C09B 29/12* (2013.01); *C09B 67/0096* (2013.01)

(58) Field of Classification Search
CPC ............................ A61Q 5/10; C09B 29/3691
See application file for complete search history.

(56) References Cited

U.S. PATENT DOCUMENTS 6,240,929 B1 * 6/2001 Richard ................. A61K 8/898
132/202

FOREIGN PATENT DOCUMENTS

JP           4080947 B2 *   4/2008   ............... A61Q 5/10

OTHER PUBLICATIONS

STIC Search Report dated Mar. 29, 2017.*

* cited by examiner

*Primary Examiner* — Eisa Elhilo
(74) *Attorney, Agent, or Firm* — Solaris Intellectual Property Group, PLLC

(57) ABSTRACT

Provided are an azo dye composition including an azo dye compound represented by Formula (I) and a urea compound represented by Formula (II), and a method for producing an azo dye composition. $R^{11}$, $R^{12}$, $R^{13}$ and $R^{14}$ each independently represent a hydrogen atom, a halogen atom, or an aliphatic group; $R^{15}$ represents an aliphatic group; $R^{21}$ and (Continued)

a: 7.7504Å
b: 9.7841Å
c: 13.3182Å

C-AXIS PROJECTION $R^{22}$ each independently represent a hydrogen atom, an aliphatic group, or an aromatic group; and n represents an integer from 0 to 2.
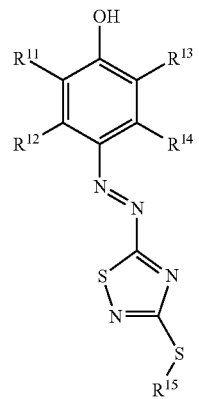
(I)
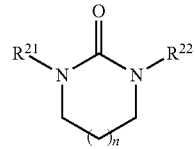
-continued
(II)
10 Claims, 2 Drawing Sheets
(51) Int. Cl.
*C09B 29/033* (2006.01)
*C09B 29/12* (2006.01)
*C09B 67/54* (2006.01)

a: 7.7504Å
b: 9.7841Å
c: 13.3182Å

AZO DYE COMPOSITION AND METHOD FOR PRODUCING SAME

CROSS-REFERENCE TO RELATED APPLICATIONS

This application is a continuation application of International Application No. PCT/JP2015/066397, filed Jun. 5, 2015, the disclosure of which is incorporated herein by reference in its entirety. Further, this application claims priority from Japanese Patent Application No. 2014-178029, filed Sep. 2, 2014, the disclosure of which is incorporated herein by reference in its entirety.

BACKGROUND OF THE INVENTION

1. Field of the Invention

The present invention relates to an azo dye composition and a method for producing the same.

2. Description of the Related Art

Azo dye compounds are compounds that can be used for various applications such as inkjet inks, color filters, hair dyes (hair dyeing agents), and sublimation type coloring matters.

For example, a hair dye composition including an azo dye compound having a particular structure (dissociative azo dye) is known (see, for example, JP4080947B).

SUMMARY OF THE INVENTION

However, the azo dye compound described in JP4080947B may have very high crystallinity depending on the type of the substituent to be substituted on the dye skeleton, or the combination of the substituents. For this reason, the azo dye compound is not easily dissolved in a solvent, and it may be difficult to obtain an azo dye compound of high purity by purification (for example, recrystallization).

An object of the present disclosure is to provide an azo dye composition from which an azo dye compound of high purity can be obtained, and a method for producing the azo dye composition.

Specific means for achieving the object described above are as follows.

<1> An azo dye composition, comprising:
an azo dye compound represented by Formula (I); and
a urea compound represented by Formula (II);

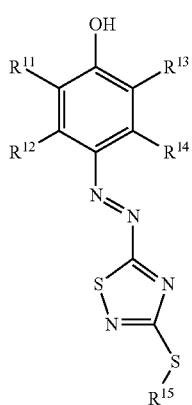

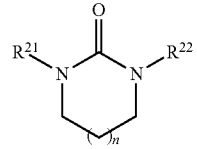

wherein, in Formula (I), $R^{11}$, $R^{12}$, $R^{13}$ and $R^{14}$ each independently represent a hydrogen atom, a halogen atom, or an aliphatic group; and $R^{15}$ represents an aliphatic group; and wherein, in Formula (II), $R^{21}$ and $R^{22}$ each independently represent a hydrogen atom, an aliphatic group, or an aromatic group; and n represents an integer from 0 to 2.

<2> The azo dye composition according to <1>, in which at least one of $R^{11}$, $R^{12}$, $R^{13}$ or $R^{14}$ represents a halogen atom.

<3> The azo dye composition according to <1> or <2>, in which $R^{21}$ and $R^{22}$ each independently represent an aliphatic group.

<4> The azo dye composition according to any one of <1> to <3>, wherein $R^{11}$, $R^{12}$, $R^{13}$ and $R^{14}$ each independently represent a hydrogen atom, a halogen atom, or an alkyl group having 1 to 3 carbon atoms, while at least one of $R^{11}$, $R^{12}$, $R^{13}$ or $R^{14}$ represents a halogen atom, wherein $R^{15}$ represents an alkyl group having 1 to 3 carbon atoms, and wherein $R^{21}$ and $R^{22}$ each independently represent an alkyl group having 1 to 3 carbon atoms.

<5> The azo dye composition according to any one of <1> to <4>, wherein at least one of or $R^{13}$ represents a halogen atom.

<6> The azo dye composition according to any one of <1> to <5>, wherein a total content of the azo dye compound represented by Formula (I) and the urea compound represented by Formula (II) is 95% by mass or more with respect to a total amount of the azo dye composition.

<7> The azo dye composition according to any one of <1> to <6>, wherein a content mass ratio of the urea compound represented by Formula (II) with respect to the azo dye compound represented by Formula (I) is from 0.5 times by mole to 1.5 times by mole.

<8> A method for producing the azo dye composition according to any one of <1> to <7>, the method comprising:

preparing a crude product of the azo dye compound represented by Formula (I); and precipitating the azo dye composition by bringing the crude product into contact with a first solvent in a second solvent that is different from the first solvent, the first solvent comprising the urea compound represented by Formula (II).

<9> The method for producing an azo dye composition according to <8>, wherein the second solvent comprises at least one selected from the group consisting of an aromatic hydrocarbon solvent, an ester solvent, a ketone solvent, a nitrile solvent, an ether solvent, an aliphatic hydrocarbon solvent, and an alcohol solvent.

<10> The method for producing an azo dye composition according to <8> or <9>, wherein the second solvent comprises at least one selected from the group consisting of toluene, xylene, mesitylene, ethylbenzene, ethyl acetate, propyl acetate, butyl acetate, ethyl propionate, acetone, methyl ethyl ketone, methyl isobutyl ketone, acetonitrile, propionitrile, diisopropyl ether, methyl-t-butyl ether, tetrahydrofuran, dioxane, hexane, heptane, octane, cyclohexane, methanol, isopropanol, and ethylene glycol.

According to the invention, there are provided an azo dye composition from which an azo dye compound of high purity can be obtained, and a method for producing the azo dye composition.

DESCRIPTION OF THE PREFERRED EMBODIMENTS

Figure 1A:
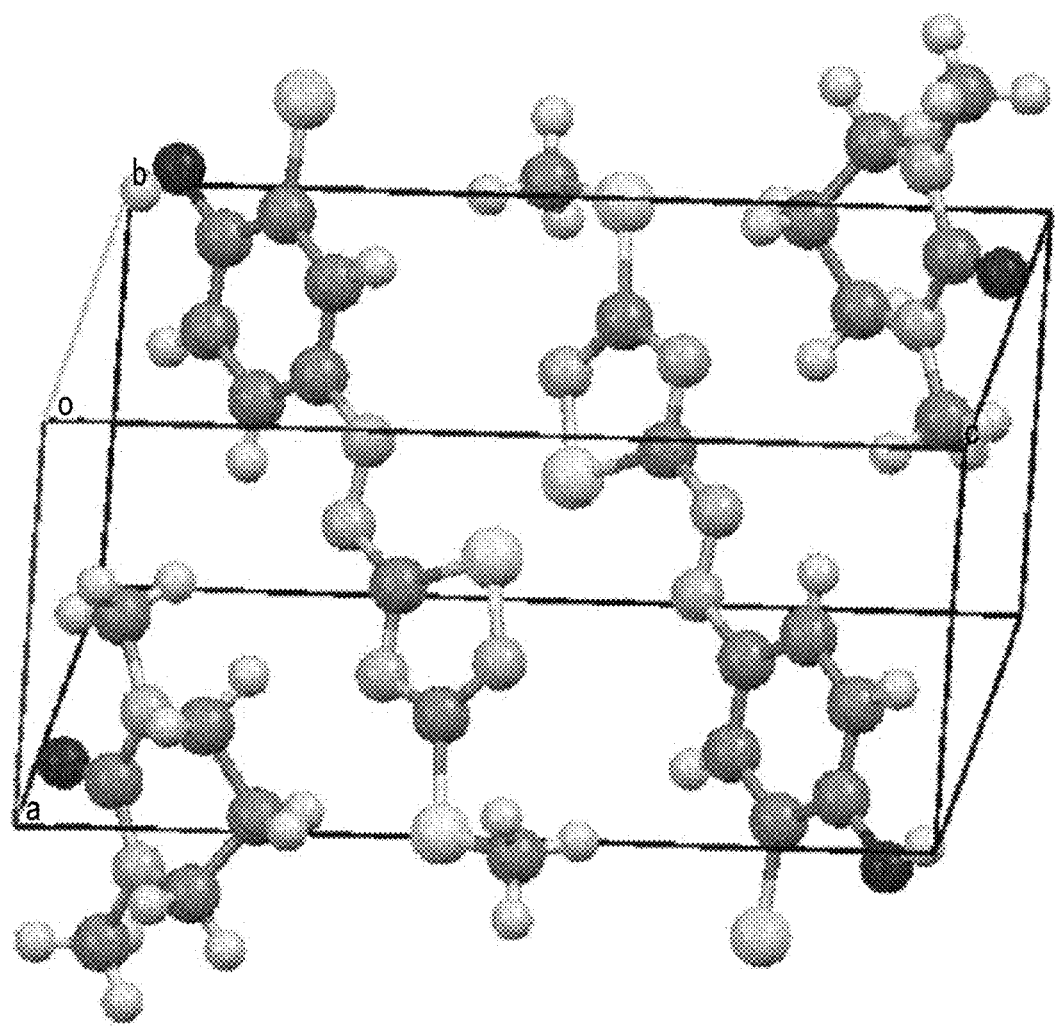
FIG. 1A is a conceptual diagram illustrating the structure of an azo dye composition according to Example 1 (Composition 24).

In the following description, the azo dye composition of the present disclosure and a method for producing the azo dye composition will be explained in detail.

According to the present specification, a numerical value range described using "to" means a range that includes the numerical values described before and after "to" as the lower limit and the upper limit, respectively.

<Azo Dye Composition>

The azo dye composition of the present disclosure includes an azo dye compound represented by the following Formula (I) (hereinafter, also simply referred to as "azo dye compound") and a urea compound represented by the following Formula (II) (hereinafter, also simply referred to as "urea compound").

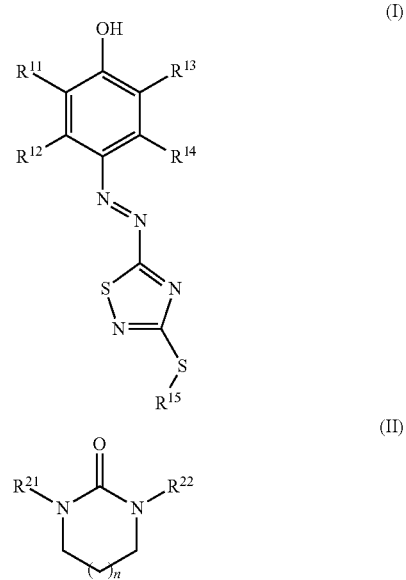

In Formula (I), $R^{11}$, $R^{12}$, $R^{13}$ and $R^{14}$ each independently represent a hydrogen atom, a halogen atom, or an aliphatic group; and $R^{15}$ represents an aliphatic group.

In Formula (II), $R^{21}$ and $R^{22}$ each independently represent a hydrogen atom, an aliphatic group, or an aromatic group; and n represents an integer from 0 to 2.

The azo dye compound can be synthesized according to a general synthesis method such as a method based on a diazo coupling reaction between an diazonium compound and a coupler compound. Generally, a synthesized azo dye compound (crude product) has impurities incorporated therein. Regarding the method for purifying a crude product of an azo dye compound having impurities incorporated therein, a method of dissolving this crude product in a solvent and then purifying the crude product (for example, recrystallization) may be used.

However, there are occasions in which an azo dye compound has very high crystallinity, and it may be difficult to dissolve the azo dye compound in a solvent. Therefore, there are occasions in which it is difficult to obtain an azo dye compound of high purity by purification.

In regard to the problems described above, the inventors of the present invention found that in the azo dye composition of the present disclosure including a combination of an azo dye compound represented by Formula (I) and a urea compound represented by Formula (II), the amount of impurities incorporated at the time of synthesis of the azo dye compound is reduced. That is, the inventors found that the azo dye composition described above includes an azo dye compound of high purity with a reduced amount of impurities. Although the reasons for this are not clearly understood, it is speculated that the reasons involve the facts that the azo dye compound represented by Formula (I) has a phenolic hydroxyl group, and the urea compound represented by Formula (II) is a weak base.

Therefore, when the azo dye composition of the present disclosure is used, an azo dye compound of high purity can be obtained.

The method for obtaining (isolating) an azo dye compound of high purity from the azo dye composition of the present disclosure will be described below.

According to the present specification, a "crude product of an azo dye compound" refers to a product formed from an azo dye compound as a pure substance and impurities incorporated thereinto at the time of synthesis.

That is, the concept of a "crude product" may include an unpurified product (for example, a product of low purity) as well as a purified product (for example, a product of relatively high purity).

The content of the azo dye compound in the crude product of the azo dye compound (that is, purity of the azo dye compound) may be, for example, 80.0% by mass to 99.0% by mass, and the content is preferably 90.0% by mass to 99.0% by mass, more preferably 95.0% by mass to 99.0% by mass, and particularly preferably 97.0% by mass to 98.5% by mass.

In the following description, the azo dye compound represented by Formula (I) and the urea compound represented by Formula (II) will be explained.

(Azo Dye Compound Represented by Formula (I))

The azo dye composition of the present disclosure includes an azo dye compound represented by the following Formula (I).

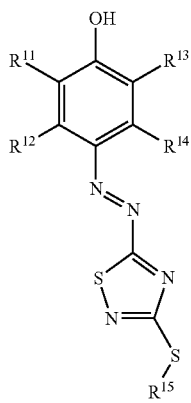

(I)

In Formula (I), $R^{11}$, $R^{12}$, $R^{13}$ and $R^{14}$ each independently represent a hydrogen atom, a halogen atom, or an aliphatic group; and $R^{15}$ represents an aliphatic group.

Examples of the halogen atom represented by any one of $R^{11}$ to $R^{14}$ include a fluorine atom, a chlorine atom, a bromine atom, or an iodine atom. A chlorine atom or a bromine atom is preferred, and a chlorine atom is more preferred.

The aliphatic group represented by any one of $R^{11}$ to $R^{14}$ may be an aliphatic group having 1 to 10 carbon atoms, and the aliphatic group is preferably an aliphatic group having 1 to 6 carbon atoms, and more preferably an aliphatic group having 1 to 3 carbon atoms.

Furthermore, the aliphatic group is preferably an alkyl group or an alkenyl group, and more preferably an alkyl group.

The aliphatic group represented by any one of $R^{11}$ to $R^{14}$ is preferably an alkyl group having 1 to 10 carbon atoms, more preferably an alkyl group having 1 to 6 carbon atoms, even more preferably an alkyl group having 1 to 3 carbon atoms, still more preferably a methyl group or an ethyl group, and particularly preferably a methyl group.

In regard to the azo dye compound represented by Formula (I), it is preferable that at least one of $R^{11}$, $R^{12}$, $R^{13}$ or $R^{14}$ represents a halogen atom, and it is more preferable that at least one of $R^{11}$ or $R^{13}$ represents a halogen atom.

In a case in which at least one of $R^{11}$, $R^{12}$, $R^{13}$ or $R^{14}$ (more preferably, at least one of $R^{11}$ or $R^{13}$) is a halogen atom, solubility of the azo dye compound is increased. Thereby, purity of the azo dye compound obtainable from the azo dye composition is further increased. Furthermore, in this case, since solubility of the azo dye compound is increased, there is also an advantage that production of the azo dye composition of the present disclosure is further facilitated.

The aliphatic group represented by $R^{15}$ has the same meaning as the aliphatic group represented by $R^{11}$ to $R^{14}$, and their preferred ranges are also the same.

The azo dye compound represented by Formula (I) can be synthesized by for example, a known method such as a diazo coupling reaction between a diazonium salt and a coupler compound. Regarding the synthesis method for the azo dye compound represented by Formula (I), appropriate reference may be made to the method described in JP4080947B.

Specific examples of the azo dye compound represented by Formula (I) (Example Compounds (I-1) to (I-13)) will be shown below; however, the invention is not intended to be limited to these specific examples.

In the following specific examples, the abbreviation "Me" represents a methyl group.

| Example Compound | Formula (I) | | | | |
|---|---|---|---|---|---|
| | $R^{11}$ | $R^{12}$ | $R^{13}$ | $R^{14}$ | $R^{15}$ |
| (I-1) | H | H | H | H | Me |
| (I-2) | Me | H | H | H | Me |
| (I-3) | H | Me | H | H | Me |
| (I-4) | Cl | H | H | H | Me |
| (I-5) | H | Cl | H | H | Me |
| (I-6) | Br | H | H | H | Me |
| (I-7) | H | Br | H | H | Me |
| (I-8) | Cl | Cl | H | H | Me |
| (I-9) | Cl | H | Cl | H | Me |
| (I-10) | Cl | H | H | Cl | Me |
| (I-11) | Cl | Me | H | H | Me |
| (I-12) | Me | Me | H | H | Me |
| (I-13) | Cl | H | Me | H | Me |

(Urea Compound Represented by Formula (II))

The azo dye composition of the present disclosure includes a urea compound represented by the following Formula (II).

Regarding the urea compound represented by Formula (II), a compound having a function as a weakly basic solvent is suitable.

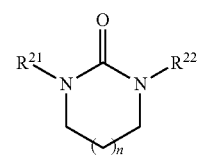

(II)

In Formula (II), $R^{21}$ and $R^{22}$ each independently represent a hydrogen atom, an aliphatic group, or an aromatic group; and n represents an integer from 0 to 2.

The aliphatic group represented by $R^{21}$ or $R^{22}$ has the same meaning as the aliphatic group represented by $R^{11}$ to $R^{14}$, and their preferred ranges are also the same.

Examples of the aromatic group represented by $R^{21}$ and $R^{22}$ include a phenyl group and a naphthyl group, and a phenyl group is preferred.

From the viewpoint of further increasing the purity of the azo dye compound obtainable from the azo dye composition, it is preferable that $R^{21}$ and $R^{22}$ each independently represent a hydrogen atom or an aliphatic group, and more preferably an aliphatic group, and even more preferably an alkyl group having 1 to 10 carbon atoms (even more preferably, 1 to 6 carbon atoms, and still more preferably 1 to 3 carbon atoms). A methyl group or an ethyl group is particularly preferred.

n represents an integer from 0 to 2; however, n is preferably 0 or 1, and particularly preferably 1.

In regard to the urea compound represented by Formula (II), a compound in which n is 0 is a compound represented by the following Formula (II)-A, a compound in which n is 1 is a compound represented by the following Formula (II)-B, and a compound in which n is 2 is a compound represented by the following Formula (II)-C.

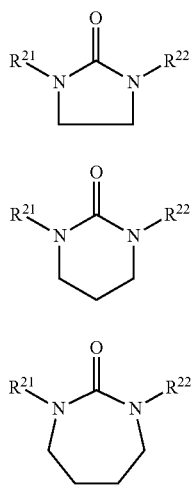
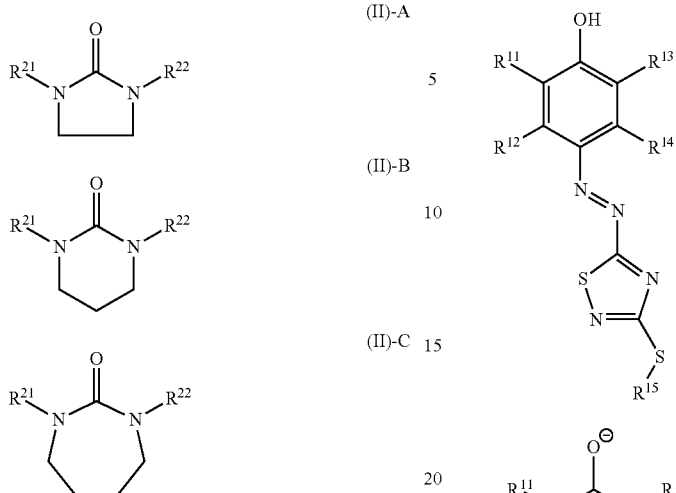
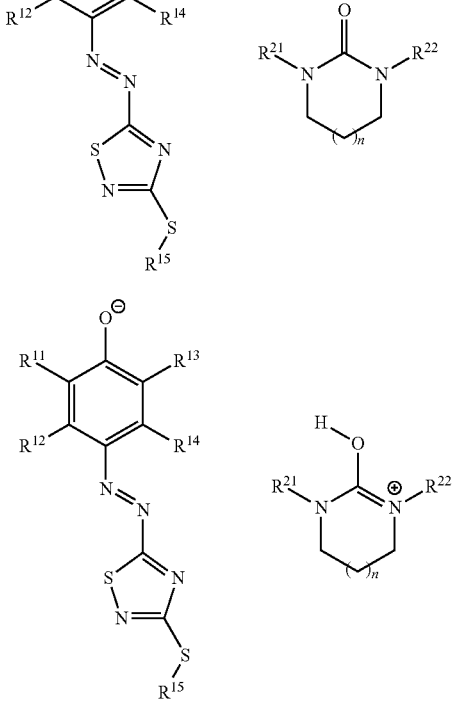

In Formula (II)-A, Formula (II)-B, and Formula (II)-C, $R^{21}$ has the same meaning as $R^{21}$ in Formula (II); and $R^{22}$ has the same meaning as $R^{22}$ in Formula (II).

Specific examples of the urea compound represented by Formula (II) (Example Compounds (II-1) to (II-4)) will be shown below; however, the invention is not intended to be limited to these specific examples.

In regard to the following specific examples, the abbreviations "Me" and "Et" represent a methyl group and an ethyl group, respectively.

| Example Compound | Formula (II) | | |
|---|---|---|---|
| | $R^{21}$ | $R^{22}$ | n |
| (II-1) | Me | Me | 0 |
| (II-2) | Et | Et | 0 |
| (II-3) | Me | Me | 1 |
| (II-4) | Et | Et | 1 |

The azo dye composition of the present disclosure may include a solvate of the azo dye compound represented by Formula (I) associated with the urea compound represented by Formula (II) (solvent), or may also include a salt of the azo dye compound and the urea compound. The azo dye composition of the present disclosure may also include both the solvate and the salt.

An example of the solvate of the azo dye compound associated with the urea compound (solvent) may be Solvate 1 described below. Solvate 1 described below is an example of a monosolvate in which one molecule of the azo dye compound is solvated by one molecule of the urea compound.

An example of the salt of the azo dye compound and the urea compound may be Salt 1 described below.

In regard to the Solvate 1, $R^{11}$, $R^{12}$, $R^{13}$, $R^{14}$, $R^{15}$, $R^{21}$, $R^{22}$ and n have the same meanings as $R^{11}$, $R^{12}$, $R^{13}$, $R^{14}$, $R^{15}$, $R^{21}$, $R^{22}$ and n in Formula (I) and Formula (II), respectively.

In regard to the Salt 1, $R^{11}$, $R^{12}$, $R^{13}$, $R^{14}$, $R^{15}$, $R^{21}$, $R^{22}$ and n have the same meanings as $R^{11}$, $R^{12}$, $R^{13}$, $R^{14}$, $R^{15}$, $R^{21}$, $R^{22}$ and n in Formula (I) and Formula (II), respectively.

As disclosed in the above-mentioned examples of salt (for example, Salt 1), the azo dye compound represented by Formula (I) in the azo dye composition of the present disclosure may be partially or entirety ionized. Similarly, the urea compound represented by Formula (II) in the azo dye composition of the present disclosure may be partially or entirety ionized.

The total content of the azo dye compound represented by Formula (I) and the urea compound represented by Formula (II) in the azo dye composition of the present disclosure is preferably 95% by mass or more, more preferably 98% by mass or more, and particularly preferably 99% by mass or more, with respect to the total amount of the azo dye composition.

When the total content is 95% by mass or more, an azo dye compound of higher purity can be obtained.

The upper limit of the total content is ideally 100% by mass; however, the upper limit may be 99.9% by mass.

Furthermore, in regard to the azo dye composition of the present disclosure, the content mass ratio of the urea compound represented by Formula (II) with respect to the azo dye compound represented by Formula (I) (content mass ratio [urea compound represented by Formula (II)/azo dye compound represented by Formula (I)]) is preferably 0.5 times by mole to 1.5 times by mole, more preferably 0.7 times by mole to 1.3 times by mole, even more preferably 0.8 times by mole to 1.2 times by mole, and still more preferably 0.9 times by mole to 1.1 times by mole.

From the viewpoint of further increasing the purity of the azo dye compound obtainable from the azo dye composition, a preferred combination of the various groups in Formula (I) and Formula (II) in the azo dye composition of the invention is the following combination.

The above-mentioned preferred combination is a combination in which:

$R^{11}$, $R^{12}$, $R^{13}$ and $R^{14}$ each independently represent a hydrogen atom, a halogen atom, or an alkyl group having 1 to 10 carbon atoms (preferably an alkyl group having 1 to 6 carbon atoms, and more preferably an alkyl group having 1 to 3 carbon atoms), while at least one of $R^{11}$, $R^{12}$, $R^{13}$ or $R^{14}$ (preferably, at least one of $R^{11}$ or $R^{13}$) is a halogen atom;

$R^{15}$ represents an alkyl group having 1 to 10 carbon atoms (preferably an alkyl group having 1 to 6 carbon atoms, and more preferably an alkyl group having 1 to 3 carbon atoms); and $R^{21}$ and $R^{22}$ each independently represent an alkyl group having 1 to 10 carbon atoms (preferably an alkyl group having 1 to 6 carbon atoms, and more preferably an alkyl group having 1 to 3 carbon atoms).

Specific examples of the combination of each of the groups in Formula (I) and each of the groups in Formula (II) in regard to the azo dye composition of the present disclosure (Compositions 1 to 40) will be shown below; however, the invention is not intended to be limited to the following specific examples.

| | Formula (I) | | | | | Formula (II) | | |
|---|---|---|---|---|---|---|---|---|
| Composition | $R^{11}$ | $R^{12}$ | $R^{13}$ | $R^{14}$ | $R^{15}$ | $R^{21}$ | $R^{22}$ | n |
| 1 | H | H | H | H | Me | Me | Me | 0 |
| 2 | Me | H | H | H | Me | Me | Me | 0 |
| 3 | H | Me | H | H | Me | Me | Me | 0 |
| 4 | Cl | H | H | H | Me | Me | Me | 0 |
| 5 | H | Cl | H | H | Me | Me | Me | 0 |
| 6 | Br | H | H | H | Me | Me | Me | 0 |
| 7 | H | Br | H | H | Me | Me | Me | 0 |
| 8 | H | H | H | H | Me | Et | Et | 0 |
| 9 | Me | H | H | H | Me | Et | Et | 0 |
| 10 | H | Me | H | H | Me | Et | Et | 0 |
| 11 | Cl | H | H | H | Me | Et | Et | 0 |
| 12 | H | Cl | H | H | Me | Et | Et | 0 |
| 13 | Br | H | H | H | Me | Et | Et | 0 |
| 14 | H | Br | H | H | Me | Et | Et | 0 |
| 15 | Cl | Cl | H | H | Me | Me | Me | 0 |
| 16 | Cl | H | Cl | H | Me | Me | Me | 0 |
| 17 | Cl | H | H | Cl | Me | Me | Me | 0 |
| 18 | Cl | Me | H | H | Me | Me | Me | 0 |
| 19 | Me | Me | H | H | Me | Me | Me | 0 |
| 20 | Cl | H | Me | H | Me | Me | Me | 0 |
| 21 | H | H | H | H | Me | Me | Me | 1 |
| 22 | Me | H | H | H | Me | Me | Me | 1 |
| 23 | H | Me | H | H | Me | Me | Me | 1 |
| 24 | Cl | H | H | H | Me | Me | Me | 1 |
| 25 | H | Cl | H | H | Me | Me | Me | 1 |
| 26 | Br | H | H | H | Me | Me | Me | 1 |
| 27 | H | Br | H | H | Me | Me | Me | 1 |
| 28 | H | H | H | H | Me | Et | Et | 1 |
| 29 | Me | H | H | H | Me | Et | Et | 1 |
| 30 | H | Me | H | H | Me | Et | Et | 1 |
| 31 | Cl | H | H | H | Me | Et | Et | 1 |
| 32 | H | Cl | H | H | Me | Et | Et | 1 |
| 33 | Br | H | H | H | Me | Et | Et | 1 |
| 34 | H | Br | H | H | Me | Et | Et | 1 |
| 35 | Cl | Cl | H | H | Me | Me | Me | 1 |
| 36 | Cl | H | Cl | H | Me | Me | Me | 1 |
| 37 | Cl | H | H | Cl | Me | Me | Me | 1 |
| 38 | Cl | Me | H | H | Me | Me | Me | 1 |
| 39 | Me | Me | H | H | Me | Me | Me | 1 |
| 40 | Cl | H | Me | H | Me | Me | Me | 1 |

Regarding the method for obtaining (isolating) an azo dye compound from the azo dye composition of the present disclosure, a general method may be used, and examples thereof include a method of treating the azo dye composition with an acid, and a method of passing the azo dye composition through an ion-exchange membrane resin.

Examples of the acid used for the acid treatment include mineral acids such as hydrochloric acid, sulfuric acid, and phosphoric acid; and organic acids such as methanesulfonic acid and trifluoroacetic acid.

In a case in which an aqueous acid solution is used for the acid treatment, the concentration of acid in the aqueous acid solution is preferably 1% by mass to 10% by mass, and more preferably 3% by mass to 6% by mass.

Specific examples of the method of performing the acid treatment include a method of adding an acid to a liquid containing a solid azo dye composition; a method of adding a solid azo dye composition to a solution containing an acid; and a method of washing a solid azo dye composition with a solution containing an acid.

The acid treatment may be carried out under heating (for example, under the conditions of a liquid temperature of 10° C. to 80° C., and preferably under the conditions of a liquid temperature of 30° C. to 60° C.).

After the acid treatment, the azo dye compound is isolated from the liquid by filtration or the like, and the isolated azo dye compound is dried. Thus, an azo dye compound of high purity can be obtained.

<Method for Producing Azo Dye Composition>

The method for producing an azo dye composition of the present disclosure (hereinafter, also referred to as "production method of the present disclosure") is a method for producing the azo dye composition of the present disclosure as described above, and the method includes a preparation step of preparing a crude product of an azo dye compound represented by Formula (I); and a precipitation step of precipitating the above-described azo dye composition by bringing the crude product into contact with a first solvent, which is a urea compound represented by Formula (II), in a second solvent that is different from the first solvent.

According to the method for producing an azo dye composition of the present disclosure, an azo dye composition from which an azo dye compound of high purity can be obtained, can be produced.

The operating mechanism providing such effects is not clearly understood; however, the operating mechanism is speculated as follows.

That is, it is speculated that in the precipitation step described above, impurities included in the crude product are dissolved in the second solvent, and the azo dye compound in the crude product and the urea compound as a first solvent interact with each other, thereby an azo dye composition being precipitated. Accordingly, it is speculated that in the azo dye composition thus precipitated, the amount of impurities is reduced, and an azo dye compound of high purity is included in the composition.

Also, it is speculated that when the azo dye composition is subjected to an acid treatment or the like, the above-described azo dye compound of high purity can be isolated from the azo dye composition.

Regarding the interaction, examples thereof include an action by which the azo dye compound is solvated with the urea compound, and an action by which a salt of the azo dye compound and the urea compound is formed.

(Preparation Step)

The preparation step is a step of preparing a crude product of the azo dye compound represented by Formula (I).

The preparation step is not limited to a process of simply preparing a crude product that has been synthesized in advance, and may also be a process for synthesizing a crude product.

Examples of the method for synthesizing a crude product include the known method described in JP4080947B.

(Precipitation Step)

The precipitation step is a step of precipitating an azo dye composition by bringing the crude product of the azo dye compound into contact with a first solvent which is a urea compound, in a second solvent that is different from the first solvent.

Specific embodiments of the contacting between the crude product of the azo dye compound and the first solvent that is a urea compound, include the following three embodiments.

(Embodiment 1) This is an embodiment in which the crude product is first added to the second solvent to produce a solution, and then the urea compound (first solvent) is added to this solution.

(Embodiment 2) This is an embodiment in which the urea compound (first solvent) is first added to the second solvent to produce a solution, and then the crude product is added to this solution.

(Embodiment 3) This is an embodiment in which the crude product and the urea compound (first solvent) are simultaneously added to the second solvent.

Among the three embodiments, Embodiment 1 is preferred from the viewpoint of more effectively precipitating the azo dye composition.

In regard to the precipitation step, the mass ratio of the urea compound (first solvent) with respect to the crude product [urea compound (first solvent)/crude product] is preferably 0.5 to 10.0, more preferably 0.8 to 5.0, and particularly preferably 1.0 to 3.0.

Furthermore, in regard to the precipitation step, the total concentration of the crude product and the urea compound (first solvent) with respect to the second solvent [(crude product+urea compound (first solvent))/second solvent] is preferably 50 g/L to 700 g/L, and more preferably 100 g/L to 500 g/L.

Furthermore, the duration of contact between the crude product and the urea compound (first solvent) in the precipitation step is preferably 3 minutes to 3 hours, more preferably 10 minutes to 2 hours, and particularly preferably 15 minutes to 1 hour.

Furthermore, in regard to the precipitation step, the liquid temperature of the mixed solution including the first solvent, the second solvent and the crude product is preferably 30° C. to 80° C., more preferably 40° C. to 70° C., and particularly preferably 40° C. to 60° C.

The second solvent is a solvent that is different from the first solvent (that is, the urea compound), and above all, a solvent which is capable of dissolving the impurities incorporated at the time of synthesis of the azo dye compound, and precipitating the azo dye composition, is suitable.

Specific examples of the second solvent include aromatic hydrocarbon-based solvents such as toluene, xylene, mesitylene, and ethylbenzene; ester-based solvents such as ethyl acetate, propyl acetate, butyl acetate, and ethyl propionate; ketone-based solvents such as acetone, methyl ethyl ketone, and methyl isobutyl ketone; nitrile-based solvents such as acetonitrile and propionitrile; ether-based solvents such as diisopropyl ether, methyl-t-butyl ether, tetrahydrofuran, and dioxane; aliphatic hydrocarbon-based solvents such as hexane, heptane, octane, and cyclohexane; and alcohol-based solvents such as ethanol, methanol, isopropanol, and ethylene glycol.

The second solvent is preferably an aromatic hydrocarbon-based solvent, an ester-based solvent, a ketone-based solvent, a nitrile-based solvent, or an ether-based solvent; more preferably an aromatic hydrocarbon-based solvent (preferably toluene), an ester-based solvent (preferably ethyl acetate), or a ketone-based solvent (preferably acetone); and particularly preferably an aromatic hydrocarbon-based solvent (preferably toluene) or an ester-based solvent (preferably ethyl acetate).

The method for producing an azo dye composition of the present disclosure as described above is suitable as a part of the purification treatment for the azo dye compound.

That is, after the azo dye composition is produced according to the production method described above, when the azo dye composition is subjected to the above-mentioned acid treatment or the like (as well as treatments such as filtration and drying as necessary), an azo dye compound of high purity (purification product) can be obtained.

EXAMPLES

Hereinafter, the invention will be described more specifically by way of Examples; however, the invention is not intended to be limited to the following Examples.

In the following description, unless particularly stated otherwise, the unit "%" refers to "% by mass".

The abbreviation "HPLC" refers to high performance liquid chromatography.

The purity (%) of a compound refers to the HPLC area ratio (%) (HPLC area %) measured by HPLC.

Example 1

<Production of Azo Dye Composition>

An azo dye composition (Composition 24 mentioned above) containing Example Compound (I-4), which is an azo dye compound, and Example Compound (II-3), which is a urea compound, was produced.

The details are disclosed below.

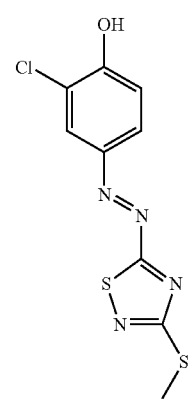

(I-4)

(II-3)

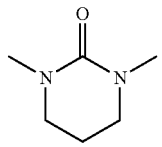

First, a crude product (purity 97.5%) of the Example Compound (I-4) was synthesized. The Example Compound (I-4) is an orange-colored azo dye compound.

Synthesis of the crude product was performed by making reference to paragraphs 0174 to 0176 of JP4080947B.

More particularly, 5-amino-3-methylthio-1,2,4-thiadiazole (12.0 mmol) was added to phosphoric acid (50 mL), and a mixture thus obtained was stirred while being cooled in ice-cold water. Sodium nitrite crystals (1.0 g) were added to the mixture, and the resulting mixture was stirred for one hour. Thus, a diazo solution was prepared. 2-Chlorophenol (10.0 mmol) was added to methanol (60 ml), and the mixture thus obtained was stirred while being cooled in ice-cold water. Subsequently, The diazo solution prepared as described above was slowly added thereto. The solution thus obtained was stirred for one hour under cooling, and was further stirred for one hour at room temperature. To the reaction liquid thus obtained, water (150 ml) and ethyl acetate (80 ml) were added, and an organic layer was extracted therefrom. Subsequently, the organic layer was washed two times with saturated saline (60 ml), and the washed organic layer was concentrated under reduced pressure. Subsequently, the concentrate was purified by silica gel column chromatography, and thus a crude product (purity 97.5%) of Example Compound (I-4) was obtained.

5.0 g of the crude product (purity 97.5%) of Example Compound (I-4) obtained as described above was suspended in 40 mL of toluene as the second solvent. Subsequently, the liquid temperature was raised to 50° C., and thereby, the crude product was dissolved. Thus, a solution was obtained.

While the liquid temperature of the solution was maintained at 50° C., 9.0 g of DMPU (N,N'-dimethylpropyleneurea; Example Compound (II-3) as the first solvent) was added dropwise for 5 minutes to the solution, and the mixture was heated and stirred for 30 minutes. Thus, a reddish purple precipitate was produced. Next, the reaction liquid including the precipitate was cooled until the liquid temperature reached 25° C.

Next, the precipitate was collected by filtration from the reaction liquid that had been cooled, and the precipitate that had been collected by filtration was dried. Thus, 5.8 g (yield 80%) of a reddish purple solid was obtained.

The solid thus obtained was analyzed by NMR, gas chromatography, and X-ray structural analysis, and it was confirmed that this solid was an azo dye composition containing Example Compound (I-4) and Example Compound (II-3) (Composition 24 described above).

Furthermore, it was confirmed that the total content of the Example Compound (I-4) and the Example Compound (II-3) with respect to the total amount of the solid (azo dye composition) was 95% by mass or more.

It was also confirmed that the total mass ratio of Example Compound (II-3) with respect to Example Compound (I-4) [Example Compound (II-3)/Example Compound (I-4)] in the solid (azo dye composition) was 1.0 times by mole.

The NMR measurement results for the azo dye composition (Composition 24) are presented below.

—NMR Measurement Results for Azo Dye Composition (Composition 24)—

$^1$H NMR (400 MHz, DMSO-d$_6$): δ=8.04 (s, 1H), 7.93 (dd, 1H), 7.22 (d, 1H), 3.19 (t, 4H), 2.76 (s, 6H), 2.52 (S, 3H), 2.51 (s, 1H), 1.88 (m, 2H)

Figure 1B:
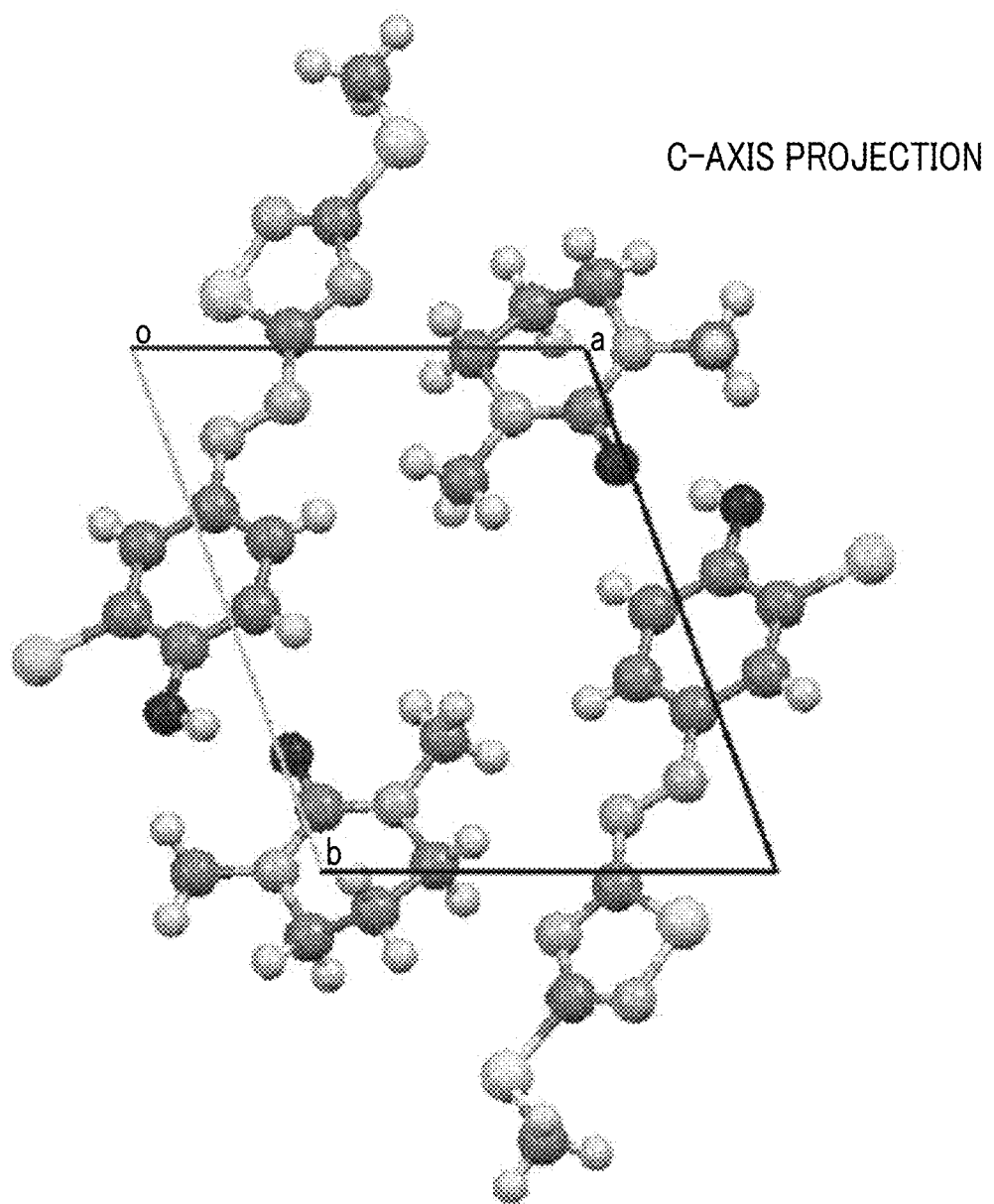
FIG. 1B is a c-axis projection of the azo dye composition shown in FIG. 1A (Composition 24).

FIG. 1A is a conceptual diagram of the structure of the azo dye composition (Composition 24) determined by an X-ray structural analysis, and FIG. 1B is a c-axis projection for the azo dye composition (Composition 24) shown in FIG. 1A.

<Measurement of Purity of Azo Dye Compound>

The reddish purple solid (Composition 24) was subjected to an acid treatment, and thereby a purification product of Example Compound (I-4) was obtained. The details will be described below.

50 g of Composition 24, 250 mL of acetonitrile, and 300 mL of acetone were introduced into a three-necked flask, and the mixture was suspended with stirring at room temperature. 25.2 g of triethylamine was added to the suspension thus obtained at room temperature, and the mixture was dissolved. The mixture was heated so as to adjust the internal temperature to 50° C., and thus a solution was obtained.

Separately, 30.6 g of concentrated hydrochloric acid and 315 mL of water were mixed, and dilute hydrochloric acid having a hydrochloric acid concentration of 3.3% by mass was prepared.

The dilute hydrochloric acid thus obtained was added dropwise to the solution that had been heated to 50° C., for one hour at 50° C. The mixture thus obtained was stirred for 30 minutes, and then the mixture was cooled so as to adjust the internal temperature to 20° C. A precipitate was collected by filtration from the mixture that had been cooled, and the precipitate that had been collected by filtration was washed with 100 mL of water and 100 mL of methanol. The precipitate obtained after washing was dried for 24 hours at 50° C., and thus 27 g (yield 78%) of a purification product of Example Compound (I-4) was obtained.

Next, the purity of Example Compound (I-4) in the purification product was measured by HPLC under the measurement conditions described below. As a result, it was confirmed that the purity of Example Compound (I-4) in the purification product was 99.5%, and the purity was increased relative to the purity of Example Compound (I-4) in the crude product used as a raw material (97.5%).

—HPLC Measurement Conditions—

Liquid A: Ultrapure water, 0.1% triethylamine, and 0.1% acetic acid

Liquid B: Acetonitrile, 0.1% triethylamine, and 0.1% acetic acid

Gradient conditions: 0 minute (volume ratio [Liquid A/Liquid B]=70/30)→60 minutes (volume ratio [Liquid A/Liquid B]=10/90)

Column: TSKgel (registered trademark) ODS-80 Ts manufactured by Tosoh Corporation, column size: 4.6 mm×150 mm Flow rate: 1 mL/min Column temperature: 40° C.

Detection wavelength: 254 nm

Apparatus: HPLC apparatus manufactured by Shimadzu Corporation. (apparatus name: LC2010)

Comparative Example 1

5.0 g (purity 97.5%) of the crude product of Example Compound (1-4) synthesized in Example 1 was suspended in 40 mL of toluene, and then the liquid temperature was raised to 50° C. Thereby, the crude product was dissolved, and a solution was obtained.

The solution was stirred for one hour at a liquid temperature of 50° C., and subsequently the solution was cooled until the liquid temperature reached 25° C. Thus, an orange-colored precipitate was produced. The precipitate was collected by filtration, and the precipitate thus collected by filtration was dried. As a result, 4.7 g of an orange-colored solid was obtained.

The orange-colored solid was subjected to HPLC under conditions similar to those used in Example 1, and thereby the purity of Example Compound (I-4) in the orange-colored solid was measured. As a result, it was confirmed that the purity of Example Compound (I-4) in the orange-colored solid was 97.6%, and the purity almost did not change relative to the purity (97.5%) of Example Compound (I-4) in the crude product used as a raw material.

Comparative Example 2

The production operation was carried out in the same manner as in Comparative Example 1, except that the toluene used in Comparative Example 1 was replaced with tetrahydrofuran (THF). Thus, 4.4 g of an orange-colored solid was obtained.

The orange-colored solid was subjected to HPLC under conditions similar to those used in Example 1, and thereby the purity of Example Compound (I-4) in the orange-colored solid was measured. As a result, it was confirmed that the purity of Example Compound (I-4) in the orange-colored solid was 98.1%, and the purity almost did not change relative to the purity (97.5%) of Example Compound (I-4) in the crude product used as a raw material.

Comparative Example 3

5.0 g (purity 97.5%) of the crude product of Example Compound (I-4) synthesized in Example 1 was suspended in 40 mL of toluene. Subsequently, the liquid temperature was raised to 50° C., and thereby the crude product was dissolved. Thus, a solution was obtained.

While the liquid temperature of the solution was maintained at 50° C., 7.1 g of triethylamine was added to the solution. However, no precipitate was recognized.

While the liquid temperature was maintained at 50° C., 30 mL of 5% hydrochloric acid was added dropwise to the solution to which triethylamine had been added. An orange-colored precipitate was produced. Next, the reaction liquid including the precipitate was cooled until the liquid temperature reached 25° C. Next, the precipitate was collected by filtration, and the precipitate thus collected by filtration was dried. Thus, 4.8 g of an orange-colored solid was obtained.

The orange-colored solid was subjected to HPLC under conditions similar to those used in Example 1, and thereby the purity of Example Compound (I-4) in the orange-colored solid was measured. As a result, it was confirmed that the purity of Example Compound (I-4) in the orange-colored solid was 97.5%, and the purity did not change relative to the purity (97.5%) of Example Compound (I-4) in the crude product used as a raw material.

Comparative Example 4

The production operation was carried out in the same manner as in Comparative Example 3, except that the triethylamine used in Comparative Example 3 was replaced with N,N-dimethylacetamide. Thus, 4.5 g of an orange-colored solid was obtained.

The orange-colored solid thus obtained was subjected to HPLC in the same manner as in Comparative Example 3, and thereby the purity of Example Compound (I-4) in the orange-colored solid was measured. As a result, it was confirmed that the purity of Example Compound (I-4) in the orange-colored composition was 98.3%, and the purity almost did not change relative to the purity (97.5%) of Example Compound (I-4) in the crude product used as a raw material.

Comparative Examples 5 to 10

The production operation was carried out in the same manner as in Comparative Example 3, except that the triethylamine used in Comparative Example 3 was replaced with pyridine (Comparative Example 5), N,N-diethylaniline (Comparative Example 6), N,N-dimethylformamide (Comparative Example 7), N-methyl-2-pyrrolidone (Comparative Example 8), N-ethyl-2-pyrrolidone (Comparative Example 9), or tetramethylurea (Comparative Example 10).

As a result, it was confirmed that in all of Comparative Examples 5 to 10, the purity of Example Compound (I-4) in the solid obtained after collection by filtration and drying almost did not change relative to the purity of Example Compound (I-4) in the crude product used as a raw material.

The entirety of the disclosure of JP2014-178029 filed on Sep. 2, 2014, is incorporated herein by reference.

All publications, patent applications, and technical standards described in this specification are herein incorporated by reference to the same extent as if each individual publication, patent application, or technical standard was specifically and individually indicated to be incorporated by reference.

What is claimed is:
1. An azo dye composition, comprising:
an azo dye compound represented by the following Formula (I); and
a urea compound represented by the following Formula (II);

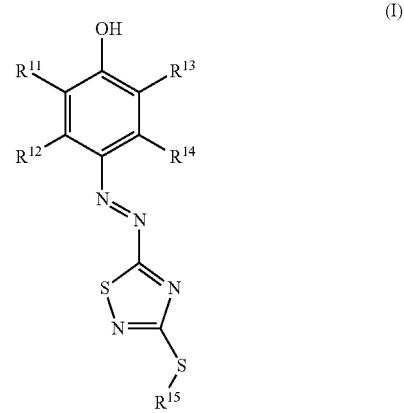

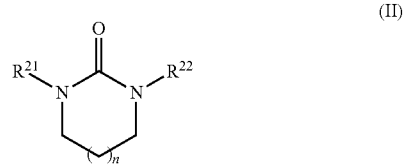

wherein, in Formula (I), $R^{11}$, $R^{12}$, $R^{13}$ and $R^{14}$ each independently represent a hydrogen atom, a halogen atom, or an aliphatic group; and $R^{15}$ represents an aliphatic group; and wherein, in Formula (II), $R^{21}$ and $R^{22}$ each independently represent an aliphatic group, or an aromatic group; and n represents an integer from 0 to 2.

2. The azo dye composition according to claim 1, wherein at least one of $R^{11}$, $R^{12}$, $R^{13}$ or $R^{14}$ represents a halogen atom.

3. The azo dye composition according to claim 1, wherein $R^{21}$ and $R^{22}$ each independently represent an aliphatic group.

4. The azo dye composition according to claim 1,
wherein $R^{11}$, $R^{12}$, $R^{13}$ and $R^{14}$ each independently represent a hydrogen atom, a halogen atom, or an alkyl group having 1 to 3 carbon atoms, while at least one of $R^{11}$, $R^{12}$, $R^{13}$ or $R^{14}$ represents a halogen atom,
wherein $R^{15}$ represents an alkyl group having 1 to 3 carbon atoms, and
wherein $R^{21}$ and $R^{22}$ each independently represent an alkyl group having 1 to 3 carbon atoms.

5. The azo dye composition according to claim 1, wherein at least one of $R^{11}$ or $R^{13}$ represents a halogen atom.

6. The azo dye composition according to claim 1, wherein a total content of the azo dye compound represented by Formula (I) and the urea compound represented by Formula (II) is 95% by mass or more with respect to a total amount of the azo dye composition.

7. The azo dye composition according to claim 1, wherein a content mass ratio of the urea compound represented by Formula (II) with respect to the azo dye compound represented by Formula (I) is from 0.5 times by mole to 1.5 times by mole.

8. A method for producing the azo dye composition according to claim 1, the method comprising:
preparing a crude product of the azo dye compound represented by Formula (I); and
precipitating the azo dye composition by bringing the crude product into contact with a first solvent in a second solvent that is different from the first solvent,
the first solvent comprising the urea compound represented by Formula (II).

9. The method for producing an azo dye composition according to claim 8, wherein the second solvent comprises at least one selected from the group consisting of an aromatic hydrocarbon solvent, an ester solvent, a ketone solvent, a nitrile solvent, an ether solvent, an aliphatic hydrocarbon solvent, and an alcohol solvent.

10. The method for producing an azo dye composition according to claim 8, wherein the second solvent comprises at least one selected from the group consisting of toluene, xylene, mesitylene, ethylbenzene, ethyl acetate, propyl acetate, butyl acetate, ethyl propionate, acetone, methyl ethyl ketone, methyl isobutyl ketone, acetonitrile, propionitrile, diisopropyl ether, methyl-t-butyl ether, tetrahydrofuran, dioxane, hexane, heptane, octane, cyclohexane, methanol, isopropanol, and ethylene glycol.

* * * * *